W. DAVIS & D. M. GODARD.
LOCK NUT.
APPLICATION FILED JUNE 19, 1908.

914,930.

Patented Mar. 9, 1909.

Witnesses

Inventors
William Davis
David M. Godard
By Victor J. Evans
Attorney

UNITED STATES PATENT OFFICE.

WILLIAM DAVIS AND DAVID M. GODARD, OF CAMERON, WEST VIRGINIA.

LOCK-NUT.

No. 914,930.  Specification of Letters Patent.  Patented March 9, 1909.

Application filed June 19, 1908. Serial No. 439,385.

*To all whom it may concern:*

Be it known that we, WILLIAM DAVIS and DAVID M. GODARD, citizens of the United States, residing at Cameron, in the county of Marshall and State of West Virginia, have invented new and useful Improvements in Lock-Nuts, of which the following is a specification.

This invention relates to lock nuts and the object of the invention is to provide a comparatively simple, cheap and effective device whereby a nut may be securely and effectively locked upon a bolt and which also provides means whereby the nut may be readily released from the bolt when desired.

With these and other objects in view the invention resides in the novel construction and arrangement of elements hereinafter fully described and claimed.

Figure 1:
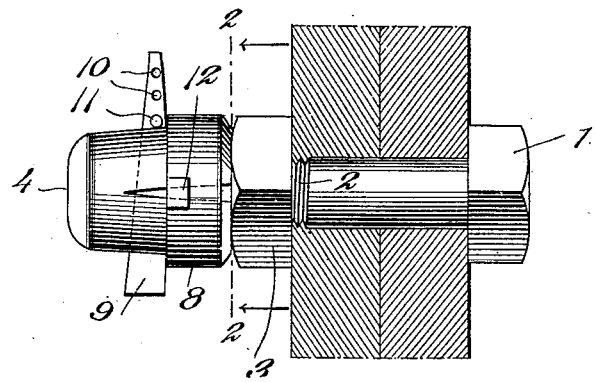
Figure 2:
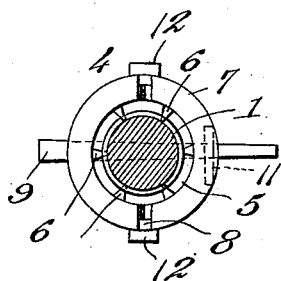
Figure 3:
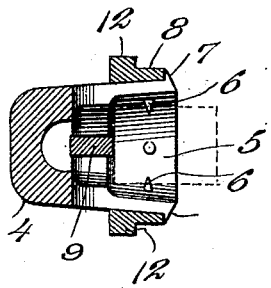

In the accompanying drawings, Figure 1 is a side elevation of a lock nut constructed in accordance with my invention and illustrating the same in applied position, the plates to which the bolt is applied being shown in section. Fig. 2 is a transverse sectional view upon the line 2—2 of Fig. 1. Fig. 3 is a central longitudinal sectional view through the locking device.

In the accompanying drawings the numeral 1 designates a bolt of the ordinary construction provided with a threaded extension 2. Secured upon the threaded extension 2 of the bolt is a nut 3 of the ordinary construction. The threaded portion 2 of the bolt is adapted to extend a suitable distance beyond the face of the nut 3, and to securely retain the bolt in locked position upon the nut, we provide a split cap 4, substantially cone-shaped and having an internal recess or cut away portion 5. The inner surface 5 is provided with a plurality of inwardly projecting teeth 6 adapted to engage between the threads of the bolt 1. The split cone-shaped collar 4 is also provided with an offset or flange 7 adjacent the inner or split end thereof, and in order to securely retain the teeth 6 in rigid or locked engagement with the threads 2, we provide a collar 8, adapted to fit over the outer end of the cap 4 and to force the split ends of the cap together, thus forcing the teeth 6 into tight engagement between the threads of the bolt. The cap 4 is also provided with a transversely arranged slot or opening adapted for the reception of a wedge shaped pin 9. This pin or finger 9 is provided with a plurality of openings 10, adapted for the reception of a pin 11, by which the finger is retained in locked position upon the cap. It is to be understood that the finger 9 is designed to bear against the collar 8 and to force the same rigidly against the offset or flanges 7 provided by the split members of the cap.

From the above description, taken in connection with the accompanying drawings it will be seen that we have provided an extremely simple and effective lock for retaining nuts upon bolts, one of which is easily and quickly applied, and which may be readily detached from the bolt when desired. In order to facilitate the removal of the collar 8 from the cap 4, the collar may be provided with offset projections 12, which will serve as an abutment adapted to be contacted by a hammer or other device to effect the withdrawal of the collar from the cap.

Having thus fully described the invention what is claimed as new is:

1. The combination of a threaded bolt and a nut therefor, of a hollow split cap provided with inwardly projecting teeth adapted to engage the threads of the bolt, a collar upon the cap adapted to force the split members of the cap together to rigidly secure the teeth between the threads of the bolt, and means for securing the collar in locked position upon the cap.

2. The combination of a threaded bolt and a nut therefor, of a cone-shaped cap having a split end provided with outwardly extending offsets, teeth extending inwardly from the split members of the cap and adapted to engage between the threads of the bolt, the cap being provided with an opening arranged transversely to the slits at the end of the cap, a collar for the cap adapted to force the split ends of the cap together and to rigidly secure the teeth between the threads of the bolt, a wedge shaped finger for the transverse opening of the cap adapted to contact the collar, the finger being provided with spaced openings, and a pin engaging one of the openings to retain the collar upon the cap.

In testimony whereof we affix our signatures in presence of two witnesses.

WILLIAM DAVIS.
DAVID M. GODARD.

Witnesses:
J. E. DAVIS,
W. H. CHASE.